US012236925B2

(12) United States Patent
Xie et al.

(10) Patent No.: US 12,236,925 B2
(45) Date of Patent: Feb. 25, 2025

(54) METHOD AND DEVICE FOR MUSIC PLAY

(71) Applicant: Beijing Bytedance Network Technology Co., Ltd., Beijing (CN)

(72) Inventors: Mengfei Xie, Beijing (CN); Yufan Xue, Beijing (CN); Wei Hua, Beijing (CN); Xiaoyu Zhu, Beijing (CN); Dailong Chen, Beijing (CN); Jia Ding, Beijing (CN); Zoujie He, Beijing (CN); Jie Weng, Beijing (CN); Chaopeng Liu, Beijing (CN); Bowen Yang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/390,256

(22) Filed: Dec. 20, 2023

(65) Prior Publication Data
US 2024/0119919 A1 Apr. 11, 2024

Related U.S. Application Data

(63) Continuation of application No. PCT/CN2022/107415, filed on Jul. 22, 2022.

(30) Foreign Application Priority Data

Sep. 4, 2021 (CN) .......................... 202111034867.5

(51) Int. Cl.
*G10H 1/46* (2006.01)
*G10H 1/00* (2006.01)
(52) U.S. Cl.
CPC .............. *G10H 1/0025* (2013.01); *G10H 1/46* (2013.01)

(58) Field of Classification Search
CPC ................................ G10H 1/0025; G10H 1/46
See application file for complete search history.

(56) References Cited

U.S. PATENT DOCUMENTS

2010/0057234 A1* 3/2010 Murata ................ G10H 1/0008
706/11
2010/0302445 A1* 12/2010 Kunihara .............. G06F 1/1601
348/569
(Continued)

FOREIGN PATENT DOCUMENTS

| CN | 201608764 U | 10/2010 |
| CN | 106575424 A | 4/2017 |

(Continued)

OTHER PUBLICATIONS

International Search Report and Written Opinion, International Patent Application No. PCT/CN2022/107415, Sep. 1, 2022, with English translation of Search Report (9 pages).

(Continued)

*Primary Examiner* — Joseph Saunders, Jr.
(74) *Attorney, Agent, or Firm* — Astute IP Law Group

(57) ABSTRACT

Embodiments of the present disclosure provide a method and a device for music play. The method comprises receiving a first operation instruction in a target application for playing music; in response to the first operation instruction, presenting a first interface of the target application, the first interface including an operation control for enhancing a play effect of the music through at least one processing, the processing being used for representing music content in a way more than sound; receiving a second operation instruction for the operation control; processing the music based on the second operation instruction during a process of playing the music.

15 Claims, 5 Drawing Sheets

(56) References Cited

U.S. PATENT DOCUMENTS

| | | | |
|---|---|---|---|
| 2011/0015765 A1* | 1/2011 | Haughay, Jr. | G06T 13/205 |
| | | | 345/440 |
| 2016/0035323 A1* | 2/2016 | Na | G06F 3/04883 |
| | | | 345/589 |
| 2016/0188181 A1 | 6/2016 | Smith | |
| 2017/0105081 A1* | 4/2017 | Jin | G10H 1/368 |

FOREIGN PATENT DOCUMENTS

| | | |
|---|---|---|
| CN | 109040822 A | 12/2018 |
| CN | 305286499 S | 8/2019 |
| CN | 110289024 A | 9/2019 |
| CN | 112764711 A | 5/2021 |
| CN | 112866770 A | 5/2021 |
| CN | 113721821 A | 11/2021 |
| DE | 10055975 A1 * | 5/2002 ............. G10H 1/46 |
| EP | 3719791 A1 | 10/2020 |

OTHER PUBLICATIONS

Office Action issued in Chinese Patent Application No. 202111034867.5, Oct. 11, 2022, with machine translation (12 pages).

Anonymous., "software recommendation—Which music player has visualizations?—Ask Ubuntu", Aug. 12, 2012, 6 pages.

Extended European Search Report for European Patent Application No. 22862947.3, mailed on Oct. 8, 2024, 10 pages.

Ghani U., "How to View Song Lyrics in iOS Music App on iPhone & iPad", Jan. 17, 2017, 6 pages.

Communication pursuant to Rules 70(2) and 70a(2) EPC for European Application No. 22862947.3, mailed Oct. 25, 2024, 1 page.

* cited by examiner

METHOD AND DEVICE FOR MUSIC PLAY

CROSS-REFERENCE TO RELATED APPLICATION(S)

This application is a continuation of International Patent Application No. PCT/CN2022/107415, filed on Jul. 22, 2022, which claims the benefit of CN Patent Application No. 202111034867.5 filed on Sep. 4, 2021, entitled "METHOD AND DEVICE FOR MUSIC PLAY", which is hereby incorporated by reference in its entirety.

FIELD

The present disclosure relates to computer processing, in particular to a method and a device for music play.

BACKGROUND

As electronic devices have been widely used, users may play music through electronic devices. Users may pre-install a music application on their electronic devices to play music through that music application. The music to be played may include at least one of the following: music downloaded from the music application, music uploaded from the local to the music application, and music received through social applications.

However, the music play mode of the conventional music apps is lack of flexibility, and therefore the play effect is unsatisfied.

SUMMARY

Embodiments of the present disclosure provide a method and a device for music play, which may enhance the above discussed play effect of the music.

In a first aspect, there is provided a method for music play comprising:
  receiving a first operation instruction in a target application for playing music;
  in response to the first operation instruction, presenting a first interface of the target application, the first interface including an operation control for enhancing a play effect of the music through at least one processing, the processing being used for representing music content in a way more than sound;
  receiving a second operation instruction for the operation control;
  processing the music based on the second operation instruction during a process of playing the music.

In a second aspect, there is provided an apparatus for music play comprising:
  a first operation instruction receiving module configured for receiving a first operation instruction in a target application for playing music;
  a first interface presenting module configured for, in response to the first operation instruction, presenting a first interface of the target application, the first interface including an operation control for enhancing a play effect of the music through at least one processing, the processing being used for representing music content in a way more than sound;
  a second operation instruction receiving module configured for receiving a second operation instruction for the operation control;
  a music play module configured for processing the music based on the second operation instruction during a process of playing the music.

In a third aspect, there is provided an electronic device comprising at least one processor and memory;
  the memory stores computer execution instructions;
  the at least one processor executes the computer execution instructions stored by the memory, to cause the electronic device to carry out the method of the first aspect.

In a fourth aspect, there is provided a computer readable storage medium storing computer execution instructions thereon. The computer execution instructions, when executed by a processor, cause a computing device to carry out the method of the first aspect.

In a fifth aspect, there is provided a computer program for carrying out the method of the first aspect.

In a sixth aspect, there is provided a computer program product, wherein the computer program product includes computer instructions for carrying out the method of the first aspect.

Embodiments of the present disclosure provide a method and a device for music play. The method comprises receiving a first operation instruction in a target application for playing music; in response to the first operation instruction, presenting a first interface of the target application, the first interface including an operation control for enhancing a play effect of the music through at least one processing, the processing being used for representing music content in a way more than sound; receiving a second operation instruction for the operation control; processing the music based on the second operation instruction during a process of playing the music. The solution of the present disclosure may achieve an enhancement of the play effect through at least one processing and therefore the play effect may be improved flexibly.

BRIEF DESCRIPTION OF DRAWINGS

The technical solutions of embodiments of the present disclosure or the prior art in combination with the drawings and with reference to the following detailed description of the embodiments of the present disclosure or the prior art. It is obvious that the following drawings are only for the purpose of illustrations. The skilled in the art may obtain other drawing based on the illustrated drawing herein without creative efforts.

DETAILED DESCRIPTIONS

The purposes, technical solutions and advantages of embodiments of the present disclosure will become more apparent in combination with the drawings and with reference to the following detailed description of the technical solution of the present disclosure. It is obvious that the following embodiments are only for the purpose of illustrations. All other embodiments that are obtained by the skilled in the art based on the illustrated embodiments without creative efforts will belong to the protective scope of the present disclosure.

Figure 1:
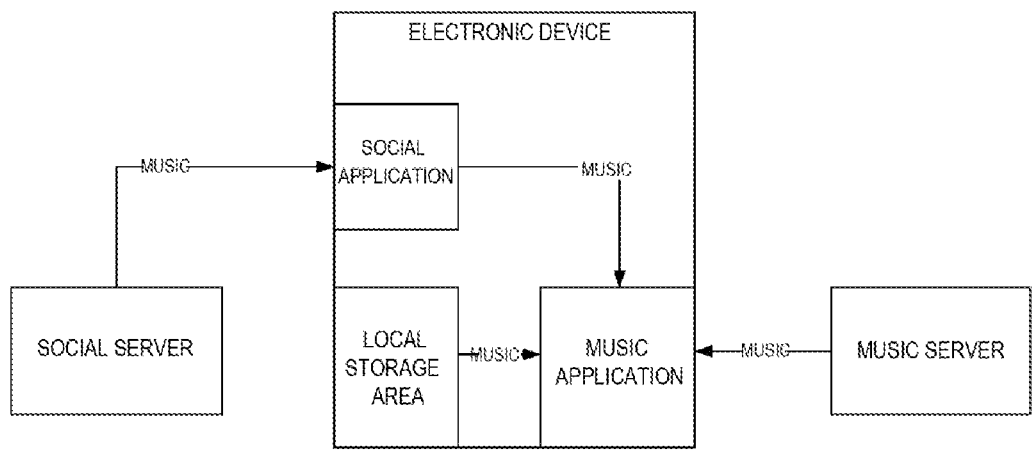
FIG. 1 illustrates a schematic diagram of a scenario for music play according to the present disclosure.

Embodiments of the present disclosure may be applied in a scenario of music play. FIG. 1 illustrates a schematic diagram of a scenario for music play according to the present disclosure. As shown in FIG. 1, the electronic device may be installed with a music application for play music. The music may include audio music and/or video music.

It can be seen from FIG. 1 that the above-mentioned music application may obtain the music from a music server, a local storage device, or a social application and play the music.

Social applications may be used for sharing data such as pictures, text, audio and video. In other words, one social application may perform data transmission with another social application via a social server, or directly with the social server. The data used hereinafter and transmitted by the social server may be data about music.

In the prior art, during the process of playing various types of music described above, the speaker of the electronic device may usually be used to play the music. The user may feel the music through the sound.

However, according to the prior art, sound is the only way for the user to feel the music, which is lack of flexibility, and therefore the play effect is unsatisfied.

In order to solve the above problems, the embodiments of the present disclosure may enhance the play effect of music by at least one processing, and the processing may be controlled by the operating controls in the first interface. In this way, the play effect of music can be enhanced flexibly.

The technical solution of the embodiments of the present disclosure and how to solve the technical problem described above will be explained in detail with reference to the following specific embodiments. Specific embodiments described as below may be combined with each other. Same or similar concepts or processes may not be repeated in some embodiments. Embodiments of the present disclosure are described below in conjunction with the drawings.

Figure 2:
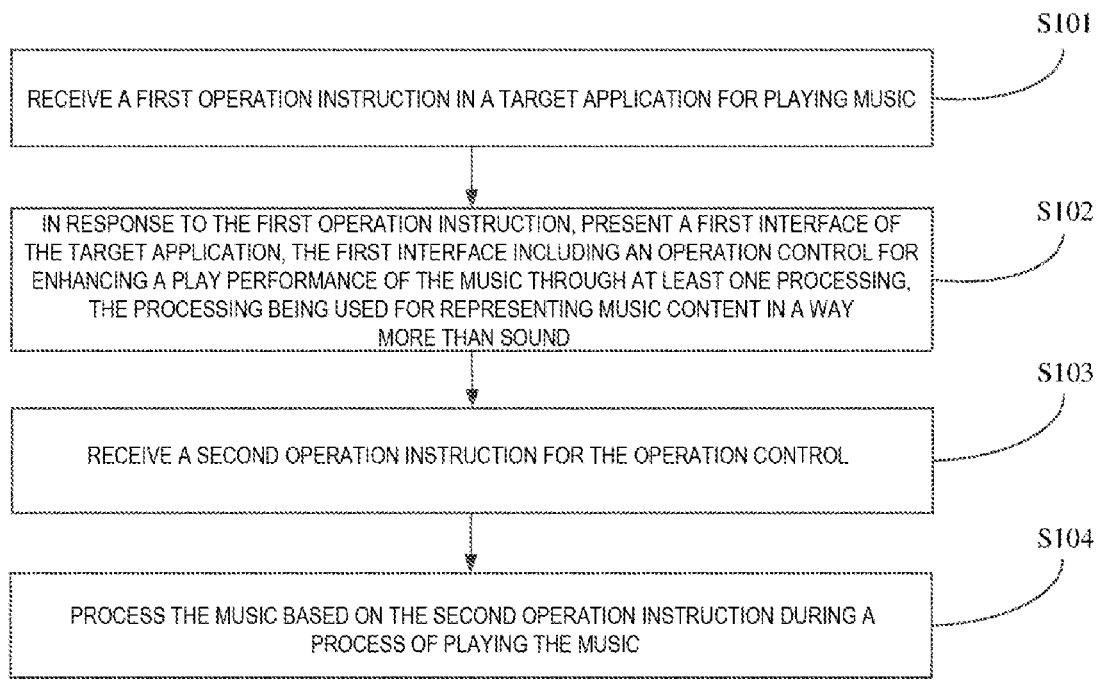
FIG. 2 illustrates a flowchart of a method for music play according to embodiments of the present disclosure.

FIG. 2 illustrates a flowchart of a method for music play according to embodiments of the present disclosure. The method shown in FIG. 2 may be applied on the electronic device. As shown in FIG. 2, the method for music play comprises:

S101: receiving a first operation instruction in a target application for playing music.

The target application may be the music application shown in FIG. 1. The target application may have a plurality of interfaces, for example, an initial interface, an interface for playing music (hereinafter may also be referred to as a third interface), an interface for selecting music, and an interface for setting up the music application. Thus, the user may perform the first operation instruction on any of the above interfaces of the target application. The first operation instruction is used for requesting the presentation of the first interface.

Specifically, the first operation instruction may be an operation of a control on the interface described above, or a sliding operation on the interface.

Figure 3:
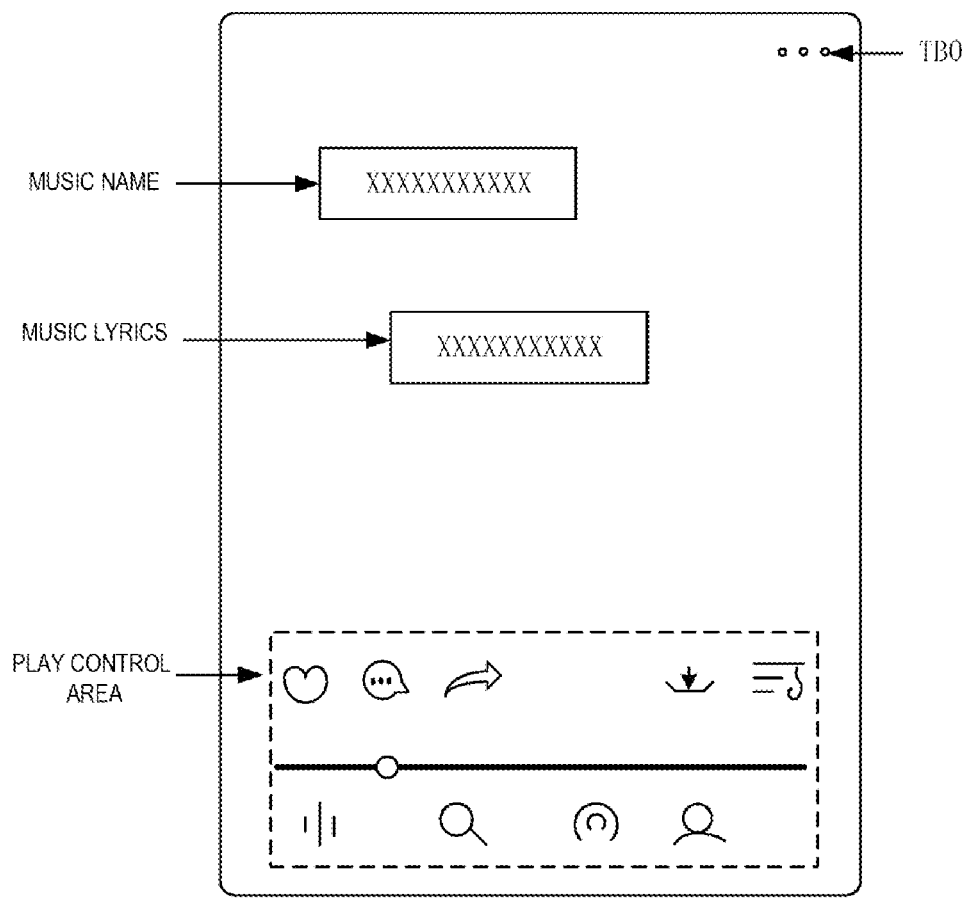
FIGS. 3 and 4 illustrate schematic diagrams of entering the first interface from the third interface according to embodiments of the present disclosure.
Figure 4:
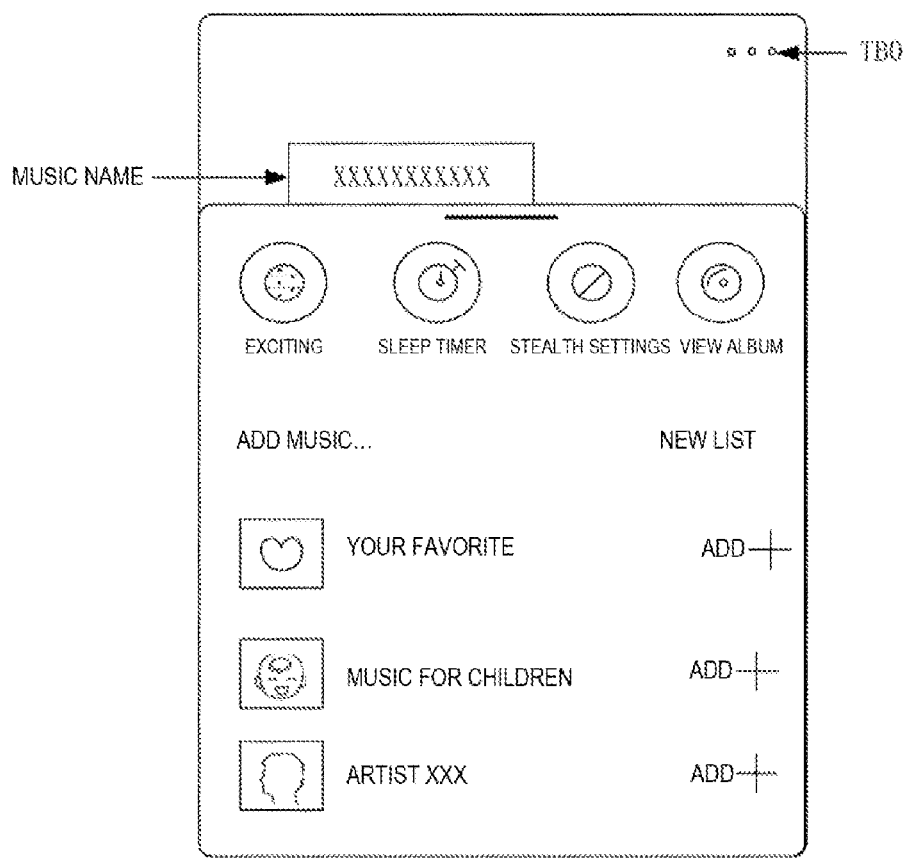

FIGS. 3 and 4 illustrate schematic diagrams of entering the first interface from the third interface according to embodiments of the present disclosure. As shown in FIG. 3, the third interface includes: a music name, music lyrics, and an area for controlling the play. The area for controlling the play is used for controlling the music being played, such as collecting the music, adjusting the play progress, adjusting the play mode, downloading the music, sharing the music, searching for the target content in the music, etc., which is not limited by the embodiments of the present disclosure.

It can be seen from the FIG. 3 that the third interface further includes the operation control TB0. After the user operates the operation control TB0 in the FIG. 3, the interface shown in FIG. 4 may be presented.

S102: in response to the first operation instruction, presenting a first interface of the target application, the first interface including an operation control for enhancing a play effect of the music through at least one processing, the processing being used for representing music content in a way more than sound.

The first interface may be used for managing the functions that enhance the play effect. Specifically, the functions that enhance the play effect may be managed through one or more operation controls in the first interface.

The number of operation controls mentioned above can be flexibly selected, so that the relationships between the operation controls and the processing are different.

If one operation control is configured, the operation control may correspond to at least one processing. That is, this operation control may enhance the play effect of the music through at least one processing. Each processing may correspond to a way to enhance the play effect. In this way, the number of operation controls in the first interface can be reduced and therefore the first interface may be simplified. However, it cannot achieve the enhancement of the play effect accurately.

If a plurality of operation controls is configured, each operation control may correspond to a processing. That is, each operation control may enhance the play effect of the music through a processing and each processing may correspond to a way to enhance the play effect. As such, each operation control may achieve a way to enhance the play effect of the music, which may facilitate to improve the accuracy of the enhancement of the play effect. However, the number of operation controls in the first interface may be increased accordingly, and the complexity of the first interface may also be increased.

In some embodiments, the at least one processing comprises at least one of the following: continuously amplifying a volume of the music, flashing a light source based on the music, flashing a screen based on the music, or vibrating based on the music.

The amplified volume of the music is a multiple of the original volume of the music. The multiple may be set as any value. In this way, when the volume of the music is enhanced, the volume of the music may be continuously enhanced. The conventional way to enhance volume may usually be achieved with preset levels, for example, a high level, a medium level, and a low level, to enhance the volume with inherent parameters. The user may select only one of these levels other than any enhancement degree. Embodiments of the present disclosure can provide continuous amplification parameters to user, so that the user can select any amplification parameter to enhance the volume, which may facilitate to improve the flexibility of the volume enhancement. Moreover, the embodiments of the present disclosure can exceed the system maximum volume, which may facilitate to improve the play effect of music in noisy environment, especially for podcasting.

Attributes such as flashing frequency, brightness, and color of the light source may relate to the music, for example, the attributes may relate to the beat point in the music, a change point of a voice in the music, and a change point of an instrument sound in the music. The change point of the voice and/or the instrument sound may include a volume change point, a timbre change point, and a tone change point.

In practical applications, some of the above attributes of the light source can be set to be related to music, and the rest of the attributes can be fixed, or randomly set, or pre-set by a corresponding operation control.

Attributes such as the flashing frequency, brightness, and color of the screen may relate to music, for example, the attributes may relate to the beat point in music, a change point of a voice in the music, and a change point of an instrument sound in the music.

In practical applications, some of the above attributes of the screen can be set to be related to music, and the rest of the attributes can be fixed, or randomly set, or pre-set by a corresponding operation control.

The vibration attributes such as the vibration frequency, the vibration duration may relate to music, for example, the vibration attributes may relate to the beat point in music, a change point of a voice in the music, and a change point of an instrument sound in the music.

In practical applications, some of the above attributes of the vibration can be set to be related to music, and the rest of the attributes can be fixed, or randomly set, or pre-set by a corresponding operation control.

Figure 5:
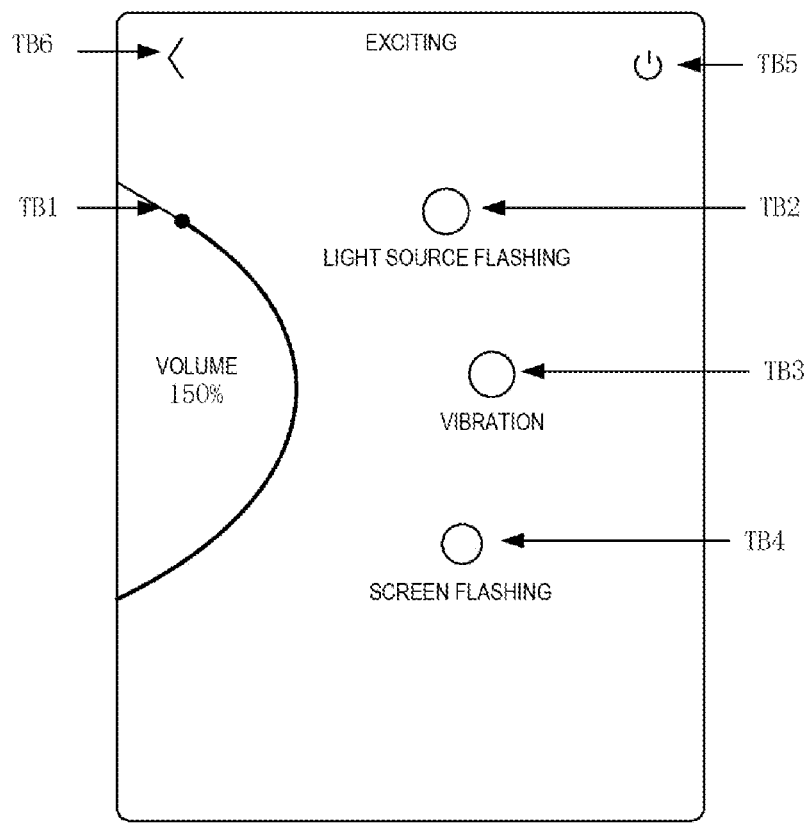
FIG. 5 illustrates a schematic structure diagram of the first interface according to embodiments of the present disclosure.

FIG. 5 illustrates a schematic structure diagram of the first interface according to embodiments of the present disclosure. The title of the first interface as shown in FIG. 5 may be call as "exciting mode", to indicate that this mode can enhance the play effect of the music.

The reference is now made to FIG. 5. As shown in FIG. 5, the first interface includes operation controls TB1 through TB4. TB1 may be a sliding bar with an arc shape for continuously amplifying the volume of music.

In addition, a boundary point may be presented on the TB1. The amplified volume corresponding to the boundary point is the system maximum volume, so that the boundary point can be used to distinguish whether the amplified volume exceeds the system maximum volume.

It is to be understood that the indication that the system maximum volume can be exceeded may also be achieved by other ways, which will not be limited by embodiments of the present disclosure. For example, in the process of sliding the arc sliding bar by user, whether the current amplified volume exceeds the system maximum volume may be indicated by the text next to the arc sliding bar.

Further, it can be seen from FIG. 5 that TB2 is a clickable control. The text "Light flashing" under the TB2 represents that the operation control is used to turn on or off the function of light flashing based on the music. For example, a user may turn on the function of light flashing based on the music by clicking the TB2 and turn off the function of light flashing based on the music by clicking the TB2 again. In this way, a switching between the on-state and off-state may be achieved by clicking the TB2 repeatedly.

Further, it can be seen from FIG. 5 that TB3 is a clickable control. The text "vibration" under the TB3 represents that the operation control is used to turn on or off the function of vibration based on the music. For example, a user may turn on the function of vibration based on the music by clicking the TB3 and turn off the function of vibration based on the music by clicking the TB3 again. In this way, a switching between the on-state and off-state may be achieved by clicking the TB3 repeatedly.

Further, it can be seen from FIG. 5 that TB4 is a clickable control. The text "screen flashing" under the TB4 represents that the operation control is used to turn on or off the function of screen flashing based on the music. For example, a user may turn on the function of screen flashing based on the music by clicking the TB4 and turn off the function of screen flashing based on the music by clicking the TB4 again. In this way, a switching between the on-state and off-state may be achieved by clicking the TB4 repeatedly.

It is to be understood that the size, the icon, the position, the sequence of operation controls in the first interface shown in FIG. 5 can be flexibly adjusted, which will not be limited by embodiments of the present disclosure.

S103: receiving a second operation instruction for the operation control.

It is to be understood that if only one operation control is configured, the second operation instruction may be considered as an operation instruction for this operation control, while if at least two operation controls are configured, the second operation instruction may be considered as an operation instruction for one of the at least two operation controls.

It is to be understood that the operation control and the second operation instruction may be different when the processing corresponding to operation controls are different.

For example, when the processing corresponding to the operation control is to continuously amplify the volume of the music, the operation control can be the sliding bar TB1 as shown in FIG. 5 and the second operation instruction may be the sliding operation of the slider bar. When the processing corresponding to the operation control is to continuously amplify the volume of the music, the operation control may also be an input control and the second operation instruction may be the amplification factor input in the input control.

For example, when the processing corresponding to the operation control is to flash the light source according to the music, the operation control can be the operation control TB2 as shown in FIG. 5 with an on-state and an off state and the second operation instruction may be an operation instruction for switching from the off state to the on state, to enable the function of the light source according to the music.

In this case, the operation control can also be associated with an adjustment control. When the operation control is in the off state, the adjustment control is not allowed to be operated. When the operation control is in the on state, the adjustment control is allowed to be operated, to adjust the flashing attributes of the light source, including but not limited to the brightness of the light source, the color of the light source, and so on.

Similarly, when the processing corresponding to the operation control is to flash the screen according to the music, the operation control can be the operation control TB4 as shown in FIG. 5 with an on-state and an off state and the second operation instruction may be an operation instruction for switching from the off state to the on state, to enable the function of the screen according to the music.

In this case, the operation control can also be associated with an adjustment control. When the operation control is in the off state, the adjustment control is not allowed to be operated. When the operation control is in the on state, the adjustment control is allowed to be operated, to adjust the flashing attributes of the screen, including but not limited to the brightness of the screen, the color of the screen, and so on.

When the processing corresponding to the operation control is to vibrate according to music, the operation control can be the operation control TB3 as shown in FIG. 5 with an on-state and an off state and the second operation instruction may be an operation instruction for switching from the off state to the on state, to enable the function of vibration according to music.

In this case, the operation control can also be associated with an adjustment control. When the operation control is in the off state, the adjustment control is not allowed to be operated. When the operation control is in the on state, the adjustment control is allowed to be operated, to adjust the vibration attributes, including but not limited to a vibration intensity, a vibration duration, and a vibration frequency.

It can be seen that the first interface provided by the embodiments of the present disclosure provides the user with a way to enhance the play effect of music. The first interface may include a variety of operation controls to enhance the play effect. Users may enhance the play effect of the music in various ways through the first interface to set different pattern for the enhancement of the play effect. Meanwhile, the switching between different interfaces may be avoided.

S104: processing the music based on the second operation instruction during a process of playing the music.

Specifically, the music is processed corresponding to the second operation instruction. For example, when the second operation instruction is a sliding operation of the sliding bar shown in FIG. 5, the volume of the music can be amplified by N times during the playing of the music, and N is determined by the position of the sliding bar after sliding. As shown in FIG. 5, the position of the sliding bar indicates that the volume of the music is amplified by 1.5 times. For example, when the second operation instruction is a click operation on the operation control TB2 shown in FIG. 5, the light source may flash according to the music during the process of playing the music. For example, when the second operation instruction is a click operation on the operation control TB3 shown in FIG. 5, the vibration according to the music may occur in the process of playing the music. For example, when the second operation instruction is a click operation on the operation control TB4 shown in FIG. 5, the screen may flash according to the music in the process of playing the music.

It is to be understood that when the second operation instruction is received, the target application may correspond to one of the following states: a mode of playing music or a mode of non-playing music.

When music is being played by the target application, in the process of playing a subsequent part of the music, the subsequent part may be processed based on the second operation instruction.

When music is not being played by the target application, the music starts to be played in the target application and the music may be processed based on the second operation instruction during the process of playing the music. In this way, after enabling the enhanced play effect of the music, the play effect of the music can be enhanced without playing the music manually by the user, which may reduce the operation complexity.

Starting playing the music may comprises at least one of the following: starting playing an example music in the target application; starting playing music from the historical play record of the target application; or starting playing the user's favorite music of the target application. The music to be played may not limited by the embodiments of the present disclosure.

In the embodiments of the present disclosure, the processing may be different if the operation controls corresponding to the second operation instruction are different. The following explains the different processing procedures with different operation controls.

When the operation control corresponding to the second operation instruction is used to continuously amplify the volume of music, during the process of playing the music, the music is processed according to the second operation instruction, including: first, determining the amplification parameter corresponding to the second operation instruction, which may be any parameter between the minimum amplification parameter and the maximum amplification parameter; Then, during the process of playing the music, the original volume of the music is amplified according to the amplification parameters, the original volume is the volume specified in the music data of the music.

The minimum and maximum amplification parameters are preset values. The minimum amplification parameter can be 1, and the maximum amplification parameter can be any value greater than 1, so the amplification parameter can be any value greater than 1.

The determination of the above amplification parameters is related to the type of operation control. When the operation control is an input control, the amplification parameter can be the numerical value entered by the user in the input control. When the operation control is the sliding bar shown in FIG. 5, the amplification parameters can be determined based on the slider position of the sliding bar.

When determining the amplification parameters based on the slider position of the sliding bar, first, the unit size corresponding to the unit size is determined based on the maximum amplification parameter, minimum amplification parameter, and the size of the operating control; Then, based on the slider position and unit amplification parameters, the amplification parameters corresponding to the second operation instruction is determined.

The unit amplification parameter can be determined through the following process: first, calculating the difference between the maximum amplification parameter and the minimum amplification parameter; then calculating the ratio of the difference to the size of the control to obtain the unit magnification parameter.

If the distance between the slider and the starting position of the sliding bar is used to indicate the slider position, then after obtaining the unit amplification parameter, the product of the slider position and the unit amplification parameter can be determined as the amplification parameter corresponding to the second operation instruction.

It can be seen that when the maximum and minimum amplification parameters are fixed, different screen sizes of electronic devices will result in different sizes of the sliding bars. At this point, the unit amplification parameters can be accurately determined, and therefore the amplification parameters may also be accurately determined, which may facilitate to improve the accuracy of volume amplification.

The operation control for amplifying the volume may be a continuous sliding control, i.e., the sliding bar. During the continuous sliding of the control, at least one of the following attributes of the control changes: a color or a size. In this way, changes in volume may indicated to the user during the sliding.

For example, during a continuous sliding, if the volume amplification parameter increases, the color of the control can gradually become darker, and/or the size of the control can gradually increase. If the amplification parameter of the volume is reduced, the color of the operation control can gradually become lighter, and/or the size of the operation control can gradually decrease.

The color and size of the operation controls can be the color and size of the slider.

If the at least one processing includes at least one of flashing the light source according to the music, flashing the screen according to the music, or vibrating according to the music, the second operation instruction is used for adjusting the operation control to an on state, and wherein the processing the music according to the second operation instruction during the process of playing the music comprises: performing the target processing in response to playing until a target point of the music, the target point comprising at least one of the following: a change point of a voice in the music, a change point of an instrument sound in the music, or a beat point of the music; the change point of the voice and/or the instrument sound includes a volume change point, a timbre change point, and a tone change point.

The volume change point can be a time point where the volume difference between the previous time point is greater than or equal to the preset threshold, the timbre change point can be a time point where the timbre is different from the previous time point, and the tone change point can be a time point where the tone is different from the previous time point.

In the embodiments of the present disclosure, when playing until the target point, the light source and/or the screen may flash and/or a vibration may occur to indicate the user that there is a change point of voice and/or instrument sound or beat point at the current time. In this way, users without knowledge of the rhythm and sound change points can determine the rhythm and sound change points through various ways such as light sources, screens, and vibrations, which may not only improve feeling of the users when they enjoy the music, but also provide the assistant in learning music knowledge.

In one embodiment, in the case where the music is being played until the target point, before performing target processing, a second interface can also be presented in the target application while playing the music. The second interface is used to present the target image. Thus, in the case where the music is being played until the target point, the target image may be presented in the second interface, which is an image including at least one color.

It is to be understood that each time when a target point is reached, the target image can be presented. In this way, the screen flashing function can be achieved through images with colors.

The target images presented at different target points can be the same. For example, for both sound change points and beat points, the same target image is presented.

The target images presented at different target points can also be different. For example, for sound change points, the same target image P1 can be presented, and for beat points, another target image P2 can be presented. The colors included in P1 and P2 can be different. In this way, users can distinguish whether the target point is a beat point or a sound change point through the target image.

Furthermore, the change points of voice and the sound of instruments can also be distinguished by different target images. The target images corresponding to the change points of different voices are different, and the target images corresponding to the change points of the sound of different instruments are different.

It is to be understood that the target images corresponding to volume change points, timbre change points, and tone change points can also be different.

In one embodiment, to make the screen flashing more fancier, the attributes of the target image can also be changed when presenting the target image in the second interface. Specifically, in the case where the music is being played until the target point, an attribute of the target image may be determined based on a time interval between the target point and a previous target point. The attribute includes at least one of the following: a size, a presenting position, a color, a presenting duration, or a shape. Then the target image may be presented in the second interface based on the attribute of the target image.

Different time intervals correspond to different attributes. For example, different time intervals result in different colors of the target image.

For quantifiable attributes, the larger the time interval, the larger or smaller the value of the attribute. For example, regarding to the size, the larger the time interval, the larger the size of the target image. For example, the larger the time interval, the longer the display duration.

To further improve the user experience, users can close the second interface. Specifically, first, a third operation instruction for the second interface is received; then, in response to the third operation instruction, a presentation of the second interface in the target application is stopped, and a third interface or an initial interface of the target application is presented, the third interface being used for presenting the music being played.

The third operation instruction can be an operation instruction for closing the control in the second interface, or a sliding operation in the second interface, which is not limited by the embodiments of the present disclosure.

It is to be understood that stopping presenting the second interface means the flashing of the screen is stopped while playing the music.

In the embodiments of the present disclosure, after receiving the third operation instruction, the flashing of the screen can be stopped through various policies as follows.

Based on the first policy, the target image can no longer be presented during the process of the playing of the current music but can continue to be presented during the process of the playing of the next music.

Based on the second policy, the target image can no longer be presented during the process of playing the music before the preset duration but continue to be presented during the process of the playing of the music after the preset duration.

Based on the third policy, the target image can no longer be presented during the process of playing the music before quitting the target application but continue to be presented during the process of playing music after restarting the target application.

Based on the fourth policy, the operation control used in the first interface to flash the screen based on the music can be automatically adjusted to the off state so that the target image is never presented again until the operation control is adjusted to the on state again with a manually operation by the user.

On the basis of the first to third policies described above, the number of third operation instructions may be counted to determine whether to adjust the operation control to the off state. In particular, when the number of the receptions of the third operation instruction is greater than or equal to a preset number threshold, the operation control in the first interface used to control the flashing screen is adjusted to the off state. That is, if the user turns off the operation control of the flashing screen several times, the function of the flashing screen can be considered as being not interested by the user, so that the function of the flashing screen is automatically turned off and the screen is no longer flashing in the process of playing the music. In this way, the experience of using the target image can be improved for the users that are not interested in the flashing screen.

When the processing corresponding to the operation control is flashing the light source, performing the target processing in response to playing until the target point of the music comprises: firstly, an intensity of the light source is determined based on a time interval between the target point and a previous target point in response to playing until the target point of the music; then, the light source may flash according to the intensity of the light source. In this way, the flashing of the light source may be fancier and the experience of enjoying the music may be enhanced for the user.

The relationship between time interval and light source intensity can include two types, which are not limited by the embodiments of the present disclosure. The first type is that the larger the time interval, the lower the intensity of the light source. On the contrast, the smaller the time interval, the greater the intensity of the light source. The second type is that the smaller the time interval, the lower the intensity of the light source. On the contrast, the larger the time interval, the greater the intensity of the light source.

When the processing corresponding to the operation control is vibration, performing the target processing in response to playing until the target point of the music comprises: first, an intensity of a vibration is determined based on a time interval between the target point and a previous target point in response to playing until the target point of the music then, vibration is performed according to the vibration intensity. In this way, the vibration effect may be more flexible and the experience of enjoying the music may be enhanced for the user.

The relationship between time interval and vibration intensity can include two types, which are not limited by the embodiments of the present disclosure. The first type is that the larger the time interval, the smaller the vibration intensity. On the contrast, the smaller the time interval, the greater the vibration intensity. The second type is that the smaller the time interval, the smaller the vibration intensity. On the contrast, the larger the time interval, the greater the vibration intensity.

After performing the second operation instruction on the operation control of the first interface, various processing can be performed as described above. After performing the second operation instruction, users can also perform the fourth or fifth operation instruction to control the first interface.

When the user performs the fourth operation command, the electronic device can perform the following steps: first, receiving a fourth operation instruction for the first interface; Then, stopping the at least one of processing for the music in the process of playing the music.

The fourth operation instruction can be the operation instruction for the operation control TB5 in FIG. 5. At this point, the operation controls TB1 to TB4 used to enhance the playback effect in the first interface may be set to the default state. The default state of TB1 is the state where the amplification parameter is 1, and the default state of TB2 to TB4 is the off state. Then, during the process of playing music, the volume of the music may no longer amplified based on the music, and the flashing of the light source screen based on the music and vibration based on the music may no longer occur. In this way, all enhancement effects may be closed by the user through a single operation control, which may avoid operating the control one by one to close the enhancement effects and therefore reduce the operation complexity.

After the user operates on TB5, the first interface can be closed and returned to the previous interface, for example, returned to the interface presenting the music being played, or returned to an initial page of the target application.

When the user performs the fifth operation command, the electronic device can perform the following steps: first, receiving a fifth operation instruction for the first interface; then stopping presenting the first interface in the target application, and presenting a third interface or an initial interface of the target application. The third interface is used for presenting the music being played.

The fifth operation instruction can be the operation instruction for the operation control TB6 in FIG. 5. At this point, the current states of the operation controls TB1 to TB4 that used for enhancing the play effect in the first interface will be kept and will not be set to the default state.

It can be seen that the fifth operation instruction is different from the fourth operation instruction. The fifth operation instruction is used for returning to the third or the initial interface, rather than turning off the enhancement effect, while the fourth operation instruction is used for returning to the third or initial interface and turning off the enhancement effect.

Figure 6:
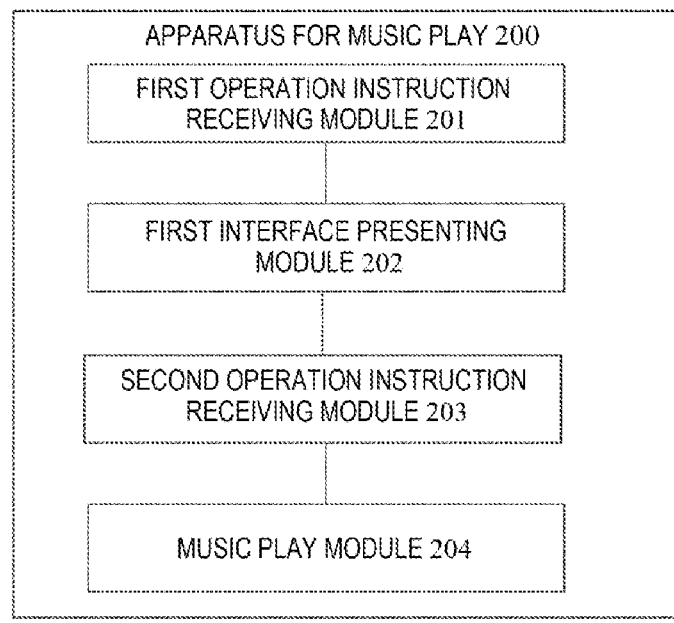
FIG. 6 illustrates a structure block diagram of an apparatus for music play according to embodiments of the present disclosure.

Corresponding to the context of the embodiments of the present disclosure, FIG. 6 illustrates a structure block diagram of an apparatus for music play according to embodiments of the present disclosure. For illustrative purposes, only the portions relevant to this disclosure embodiment are shown. As shown in FIG. 6, the apparatus 200 for music play comprises a first operation instruction receiving module 201, a first interface presenting module 202, a second operation instruction receiving module 203 and a music play module 204.

The first operation instruction receiving module 201 is configured for receiving a first operation instruction in a target application for playing music.

The first interface presenting module 202 is configured for, in response to the first operation instruction, presenting a first interface of the target application, the first interface including an operation control for enhancing a play performance of the music through at least one processing, the processing being used for representing music content in a way more than sound.

The second operation instruction receiving module 203 is configured for receiving a second operation instruction for the operation control.

The music play module 204 is configured for processing the music based on the second operation instruction during a process of playing the music.

In some embodiments, the apparatus may further comprises:
  a music turning on module 204 configured for, before the processing the music based on the second operation instruction during the process of playing the music, in response to the second operation instruction, starting playing the music in the target application if the target application is not playing music.

In some embodiments, the at least one processing comprises at least one of the following: continuously amplifying a volume of the music, flashing a light source based on the music, flashing a screen based on the music, or vibrating based on the music.

In some embodiments, when the operation control is used for continuously amplifying the volume of the music, the music turning on module 204 is further configured for:

when processing the music based on the second operation instruction during the process of playing the music, determining an amplification parameter corresponding to the second operation instruction, the amplification parameter being any parameter between a minimum amplification parameter and a maximum amplification parameter; amplifying an original volume of the music based on the amplification parameter during the process of playing the music, the original volume being a volume specified in music data of the music.

In some embodiments, the operation control is a continuous sliding control, and the operation control changes, during a continuous sliding process of the operation control, with at least one of the following attributes: a color, a size.

In some embodiments, the music turning on module 204 is further configured for:

when determining the amplification parameter corresponding to the second operation instruction, determining a unit amplification parameter corresponding to a unit size based on the maximum amplification parameter, the minimum amplification parameter and a size of the operation control; and determining the amplification parameter corresponding to the second operation instruction based on a slider position of the continuous sliding control and the unit amplification parameter.

In some embodiments, if the at least one processing includes at least one of flashing the light source based on the music, flashing the screen based on the music, or vibrating based on the music, the second operation instruction is used for adjusting the operation control to an on state, the music turning on module 204 is further configured for:

performing the target processing in response to playing until a target point of the music, the target point comprising at least one of the following: a change point of a voice in the music, a change point of an instrument sound in the music, or a beat point of the music; the change point of the voice and/or the instrument sound includes a volume change point, a timbre change point, and a tone change point.

In some embodiments, the apparatus further comprises:

a second interface presentation module configured for in response to playing the music, presenting a second interface in the target application.

Based on the second interface presentation module, the music turning on module 204 is further configured for:

in response to playing until the target point of the music, presenting a target image in the second interface in response to playing until the target point of the music, the target image being an image including at least one color.

In some embodiments, the music turning on module 204 is further configured for:

in response to playing until the target point of the music, determining an attribute of the target image based on a time interval between the target point and a previous target point, the attribute including at least one of the following: a size, a presenting position, a color, a presenting duration, or a shape; presenting the target image in the second interface based on the attribute of the target image.

In some embodiments, the apparatus further comprises a third operation instruction receiving module and a second interface presentation terminating module.

The third operation instruction receiving module is configured for receiving a third operation instruction for the second interface.

The second interface presentation stopping module is configured for, in response to the third operation instruction, stopping presenting the second interface in the target application, and presenting a third interface or an initial interface of the target application, the third interface being used for presenting the music being played.

In some embodiments, the apparatus further comprises:

a screen flashing off module configured for, in response to the number of reception times of the third operation instruction exceeding or reaching a preset threshold of reception time, adjusting the operation control for controlling flashing screen in the first interface to an off state.

In some embodiments, the music turning on module 204 is further configured for:

determining an intensity of the light source based on a time interval between the target point and a previous target point in response to playing until the target point of the music; and flashing the light source based on the intensity of the light source.

In some embodiments, the music turning on module 204 is further configured for:

determining an intensity of a vibration based on a time interval between the target point and a previous target point in response to playing until the target point of the music; and vibrating based on the intensity of the vibration.

In some embodiments, the apparatus further comprises a fourth operation instruction receiving module and a processing stopping module.

The fourth operation instruction receiving module is configured for receiving a fourth operation instruction for the first interface.

The processing stopping module is configured for stopping the at least one of processing for the music in the process of playing the music.

In some embodiments, the apparatus further comprises a fifth operation instruction receiving module and a first interface presentation stopping module.

The fifth operation instruction receiving module is configured for receiving a fifth operation instruction for the first interface.

The first interface presentation stopping module is configured for stopping presenting the first interface in the target application and presenting a third interface or an initial interface of the target application, the third interface being used for presenting the music being played.

The apparatus for music play provided by embodiments of the present disclosure may be used to execute the technical solution of the method embodiment shown in FIG. 2 described above, which may be implemented based on similar principle and achieve similar technical effect that will not be repeated here.

Figure 7:
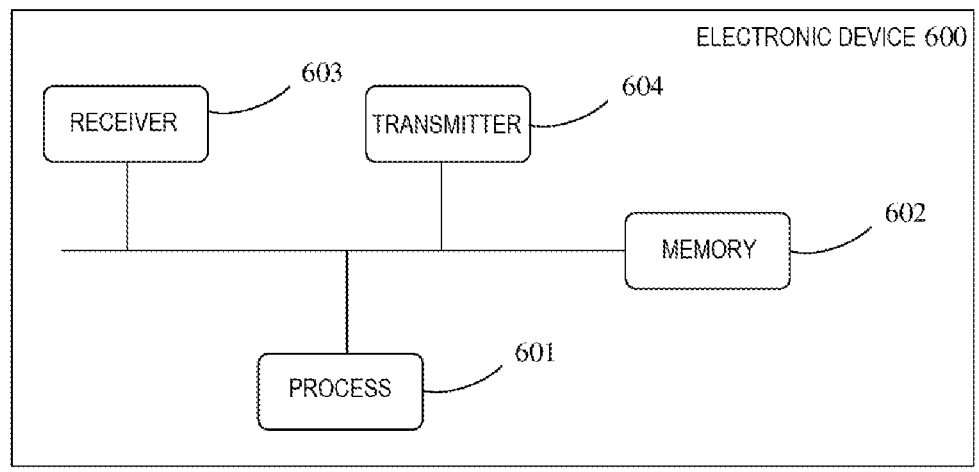
FIGS. 7 and 8 illustrate structure block diagrams of two electronic devices according to embodiments of the present disclosure.

FIG. 7 illustrates a structure block diagram of an electronic device 600 according to embodiments of the present disclosure. The electronic device 600 comprises a memory 602 and at least one processor 601.

The memory 602 stores computer execution instruction.

The at least one processor 601 executes the computer execution instructions stored by the memory 602, to cause the electronic device 600 to carry out the method for music play as shown in FIG. 2.

In addition, the electronic device 600 may also include a receiver 603 and a transmitter 604, the receiver 603 is used to receive information from other apparatuses or devices and forward it to the processor 601, and the transmitter 604 is used to transmit information to other apparatuses or devices.

Figure 8:
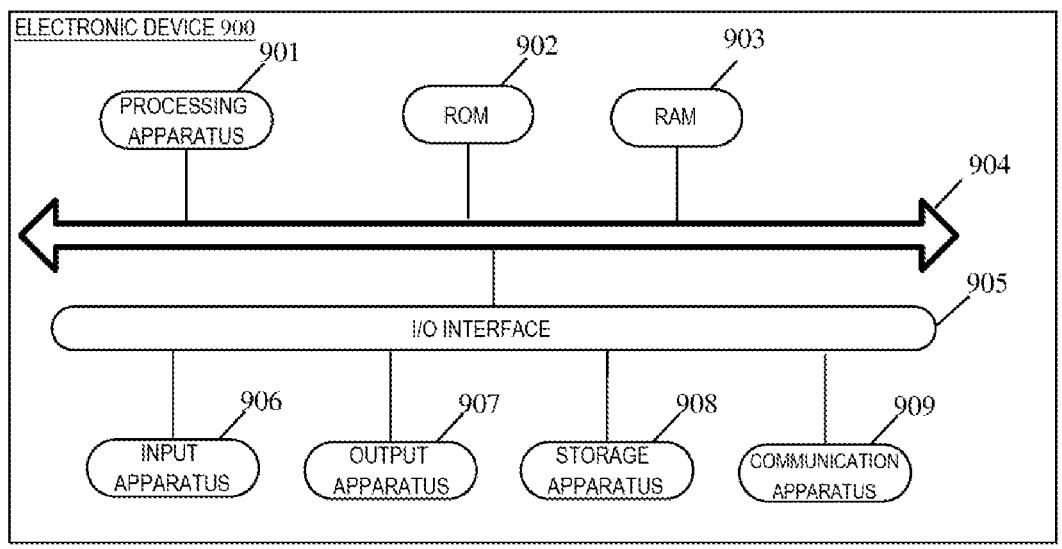

Reference is now made to FIG. 8, which illustrates a schematic structure diagram of an electronic device 900 for implementing embodiments of the present disclosure. The electronic device 900 may be a terminal device. The terminal devices may include, but are not limited to, mobile terminals such as mobile phones, laptops, digital broadcasting receivers, personal digital assistants (PDAs), portable android devices (PADs), portable multimedia players (PMPs), terminals on broad (such as navigation terminals on broad), and fixed terminals such as digital TVs, desktop computers, and the like. The electronic device shown in FIG. 8 is only for the propose of illustration and should not suggest any limitations on the functionality and scope of use of the disclosed embodiment.

As shown in FIG. 8, the electronic device 900 may include a processing apparatus (e.g., a central processing unit, a graphics processor, etc.) 901 that can perform various appropriate actions and processes based on programs stored in read-only memory (ROM) 902 or loaded from the storage apparatus 808 into random access memory (RAM) 903. In RAM 903, various programs and data required for the operation of the electronic device 900 are also stored. The processing unit 901, ROM 902, and RAM 903 are connected to each other via bus 904. The input/output (I/O) interface 905 is also connected to bus 904.

In general, the following devices can be connected to the I/O interface 905: an input apparatus 906 including, for example, touch screen, touchpad, keyboard, mouse, camera, microphone, accelerometer, gyroscope, etc.; an output apparatus 907 such as liquid crystal display (LCD), speakers, vibrators, etc.; a storage apparatus 908 such as magnetic tape, hard disk, etc.; and a communication apparatus 909. The communication apparatus 909 may allow electronic devices to communicate wirelessly or wired with other devices to exchange data. Although FIG. 8 shows an electronic device 900 with a variety of devices, it is to be understood that it is not required to implement or deploy all of the devices shown. More or fewer apparatuses may be implemented or possessed instead.

Specifically, according to the disclosed embodiments, the process described above with reference to the flowchart can be implemented as a computer software program. For example, the disclosed embodiment includes a computer program product that includes a computer program carried on a non transient computer-readable medium, which includes program code for executing the method shown in the flowchart. In such embodiments, the computer program can be downloaded and installed from the network through communication apparatus 909, or installed from storage apparatus 908, or installed from ROM 902. When the computer program is executed by the processing apparatus 901, the above-mentioned functions defined in the method of the present disclosed embodiment are executed.

It is to be noted that the computer-readable medium mentioned in this disclosure can be a computer-readable signal medium, a computer-readable storage medium, or any combination of the two. Computer readable storage media can be, for example, but not limited to, systems, devices or devices of electricity, magnetism, light, electromagnetism, infrared, or semiconductors, or any combination of the above. More specific examples of computer-readable storage media may include, but are not limited to: electrical connections with one or more wires, portable computer disks, hard drives, random access memory (RAM), read-only memory (ROM), erasable programmable read-only memory (EPROM or flash memory), optical fibers, portable compact disk read-only memory (CD-ROM), optical storage devices, magnetic storage devices Or any suitable combination of the above. In this disclosure, a computer-readable storage medium may be any tangible medium that contains or stores a program, which can be used by or in combination with an instruction execution system, device, or device. In this disclosure, computer-readable signal media may include data signals propagated in the baseband or as part of the carrier wave, which carry computer-readable program code. This propagation of data signals can take various forms, including but not limited to electromagnetic signals, optical signals, or any suitable combination of the above. A computer-readable signal medium can also be any computer-readable medium other than a computer-readable storage medium, which can send, propagate, or transmit programs for use by or in combination with instruction execution systems, devices, or devices. The program code contained on computer readable media can be transmitted using any suitable medium, including but not limited to wires, optical cables, RF (radio frequency), etc., or any suitable combination of the above.

The computer readable medium mentioned above can be included in the electronic device mentioned above; it can also exist separately without being assembled into the electronic device.

The computer readable medium carries one or more programs. When one or more programs are executed by the electronic device, cause the electronic device to carry out the method of embodiments of the present disclosure.

Computer program code for executing the operations disclosed herein may be written in one or more programming languages or combinations thereof, including but not limited to object-oriented programming languages such as Java, Smalltalk, C++, as well as conventional procedural programming languages such as "C" or similar programming languages. Program code can be completely executed on the user's computer, partially executed on the user's computer, executed as a standalone software package, partially executed on the user's computer, partially executed on a remote computer, or completely executed on a remote computer or server. In cases involving remote computers, the remote computer can be connected to the user's computer through any type of network, including a local area network (LAN) or wide area network (WAN), or can be connected to an external computer (such as using an Internet service provider to connect through the Internet).

The flowchart and block diagram in the attached figure illustrate the possible architecture, functions, and operations of systems, methods, and computer program products according to various embodiments of the present disclosure. At this point, each box in a flowchart or block diagram can represent a module, program segment, or part of code that contains one or more executable instructions for implementing specified logical functions. It should also be noted that in some alternative implementations, the functions indicated in the boxes can also occur in a different order than those indicated in the accompanying drawings. For example, two consecutive boxes can actually be executed in parallel, and sometimes they can also be executed in the opposite order, depending on the function involved. It should also be noted that each box in the block diagram and/or flowchart, as well as the combination of boxes in the block diagram and/or flowchart, can be implemented using dedicated hardware based systems that perform specified functions or operations, or can be implemented using a combination of dedicated hardware and computer instructions.

The units described in the present disclosed embodiment can be implemented through software or hardware. The name of the unit does not constitute a qualification for the unit itself in a certain situation, for example, the first obtaining unit can also be described as "the unit for obtaining at least two internet protocol addresses".

The functions described above in this article can be at least partially executed by one or more hardware logic components. For example, non-limiting examples of hardware logic components that can be used include: Field Programmable Gate Arrays (FPGAs), Application Specific Integrated Circuits (ASICs), Application Specific Standard Products (ASSPs), On Chip Systems (SOC), Complex Programmable Logic Devices (CPLDs), and so on.

In the context of this disclosure, machine readable media can be tangible media that can contain or store programs for use by or in combination with instruction execution systems, devices, or devices. A machine readable media can be machine readable signal media or machine readable storage media. A machine readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the first example of the first aspect, embodiments of the present disclosure provide a method for music play, comprising:

receiving a first operation instruction in a target application for playing music;

in response to the first operation instruction, presenting a first interface of the target application, the first interface including an operation control for enhancing a play effect of the music through at least one processing, the processing being used for representing music content in a way more than sound;

receiving a second operation instruction for the operation control;

processing the music based on the second operation instruction during a process of playing the music.

Based on the first example of the first aspect, in the second example of the first aspect, before the processing the music according to the second operation instruction during the process of playing the music, the method further comprises:

in response to the second operation instruction, start playing the music in the target application if the target application is not playing music.

Based on the first example of the first aspect, in the third example of the first aspect, the at least one processing comprises at least one of the following: continuously amplifying a volume of the music, flashing a light source according to the music, flashing a screen according to the music, or vibrating according to the music.

Based on the third example of the first aspect, in the fourth example of the first aspect, if the operation control is used for continuously amplifying the volume of the music, the processing the music according to the second operation instruction during the process of playing the music comprises:

determining an amplification parameter corresponding to the second operation instruction, the amplification parameter being any parameter between a minimum amplification parameter and a maximum amplification parameter;

amplifying an original volume of the music according to the amplification parameter during the process of playing the music, the original volume being a volume specified in music data of the music.

Based on the fourth example of the first aspect, in the fifth example of the first aspect, the operation control is a continuous sliding control, and the operation control changes, during a continuous sliding process of the operation control, with at least one of the following attributes: a color, a size.

Based on the fourth example of the first aspect, in the sixth example of the first aspect, the determining the amplification parameter corresponding to the second operation instruction comprises:

determining a unit amplification parameter corresponding to a unit size based on the maximum amplification parameter, the minimum amplification parameter and a size of the operation control; and determining the amplification parameter corresponding to the second operation instruction based on a slider position of the continuous sliding control and the unit amplification parameter.

Based on the third example of the first aspect, in the seventh example of the first aspect, if the at least one processing includes at least one of flashing the light source according to the music, flashing the screen according to the music, or vibrating according to the music, the second operation instruction is used for adjusting the operation control to an on state, and wherein the processing the music according to the second operation instruction during the process of playing the music comprises:

performing the target processing in response to playing until a target point of the music, the target point comprising at least one of the following: a change point of a voice in the music, a change point of an instrument sound in the music, or a beat point of the music, the change point of the voice and/or the instrument sound includes a volume change point, a timbre change point, and a tone change point.

Based on the seventh example of the first aspect, in the eighth example of the first aspect, before the performing the target processing in response to playing until the target point of the music, further comprising:

in response to playing the music, presenting a second interface in the target application;

the performing the target processing in response to playing until the target point of the music comprises:

presenting a target image in the second interface in response to playing until the target point of the music, the target image being an image including at least one color.

Based on the eighth example of the first aspect, in the ninth example of the first aspect, the presenting a target image in the second interface in response to playing until the target point of the music comprises:

in response to playing until the target point of the music, determining an attribute of the target image based on a time interval between the target point and a previous target point, the attribute including at least one of the following: a size, a presenting position, a color, a presenting duration, or a shape;

presenting the target image in the second interface based on the attribute of the target image.

Based on the eighth example of the first aspect, in the tenth example of the first aspect, after presenting a target image in the second interface in response to playing until the target point of the music, the method further comprises:

receiving a third operation instruction for the second interface;

in response to the third operation instruction, stopping presenting the second interface in the target application, and presenting a third interface or an initial interface of the target application, the third interface being used for presenting the music being played.

Based on the tenth example of the first aspect, in the eleventh example of the first aspect, further comprising:

in response to the number of reception times of the third operation instruction exceeding or reaching a preset threshold of reception time, adjusting the operation control for controlling flashing screen in the first interface to an off state.

Based on the seventh example of the first aspect, in the twelfth example of the first aspect, the performing the target processing in response to playing until the target point of the music comprises:

determining an intensity of the light source based on a time interval between the target point and a previous target point in response to playing until the target point of the music;

flashing the light source according to the intensity of the light source.

Based on the seventh example of the first aspect, in the thirteenth example of the first aspect, the performing the target processing in response to playing until the target point of the music comprises:

determining an intensity of a vibration based on a time interval between the target point and a previous target point in response to playing until the target point of the music;

vibrating according to the intensity of the vibration.

Based on any of the first example to the thirteenth example of the first aspect, in the fourteenth example of the first aspect, further comprising:

receiving a fourth operation instruction for the first interface;

stopping the at least one of processing for the music in the process of playing the music.

Based on any of the first example to the thirteenth example of the first aspect, in the fifteenth example of the first aspect, further comprising:

receiving a fifth operation instruction for the first interface;

stopping presenting the first interface in the target application, and presenting a third interface or an initial interface of the target application, the third interface being used for presenting the music being played.

In the first example of the second aspect, embodiments of the present disclosure provide an apparatus for music play, comprising:

a first operation instruction receiving module configured for receiving a first operation instruction in a target application for playing music;

a first interface presenting module configured for, in response to the first operation instruction, presenting a first interface of the target application, the first interface including an operation control for enhancing a play effect of the music through at least one processing, the processing being used for representing music content in a way other than sound;

a second operation instruction receiving module configured for receiving a second operation instruction for the operation control;

a music play module configured for processing the music according to the second operation instruction during a process of playing the music.

Based on the first example of the second aspect, in the second example of the second aspect, the apparatus further comprises:

a music turning on module configured for, before the processing the music based on the second operation instruction during the process of playing the music, in response to the second operation instruction, starting playing the music in the target application if the target application is not playing music.

Based on the first example of the second aspect, in the third example of the second aspect, the at least one processing comprises at least one of the following: continuously amplifying a volume of the music, flashing a light source based on the music, flashing a screen based on the music, or vibrating based on the music.

Based on the third example of the second aspect, in the fourth example of the second aspect, when the operation control is used for continuously amplifying the volume of the music, the music turning on module is further configured for:

When processing the music based on the second operation instruction during the process of playing the music, determining an amplification parameter corresponding to the second operation instruction, the amplification parameter being any parameter between a minimum amplification parameter and a maximum amplification parameter; amplifying an original volume of the music based on the amplification parameter during the process of playing the music, the original volume being a volume specified in music data of the music.

Based on the fourth example of the second aspect, in the fifth example of the second aspect, the operation control is a continuous sliding control, and the operation control changes, during a continuous sliding process of the operation control, with at least one of the following attributes: a color, a size.

Based on the fourth example of the second aspect, in the sixth example of the second aspect, the music turning on module is further configured for:

When determining the amplification parameter corresponding to the second operation instruction, determining a unit amplification parameter corresponding to a unit size based on the maximum amplification parameter, the minimum amplification parameter and a size of the operation control; and determining the amplification parameter corresponding to the second operation instruction based on a slider position of the continuous sliding control and the unit amplification parameter.

Based on the third example of the second aspect, in the seventh example of the second aspect, if the at least one processing includes at least one of flashing the light source based on the music, flashing the screen based on the music, or vibrating based on the music, the second operation instruction is used for adjusting the operation control to an on state, the music turning on module is further configured for:

performing the target processing in response to playing until a target point of the music, the target point comprising at least one of the following: a change point of a voice in the music, a change point of an instrument sound in the music, or a beat point of the music; the change point of the voice and/or the instrument sound includes a volume change point, a timbre change point, and a tone change point.

Based on the seventh example of the second aspect, in the eighth example of the second aspect, the apparatus further comprises:
a second interface presentation module configured for in response to playing the music, presenting a second interface in the target application.

Based on the second interface presentation module, the music turning on module is further configured for:
in response to playing until the target point of the music, presenting a target image in the second interface in response to playing until the target point of the music, the target image being an image including at least one color.

Based on the eighth example of the second aspect, in the ninth example of the second aspect, the music turning on module is further configured for:
in response to playing until the target point of the music, determining an attribute of the target image based on a time interval between the target point and a previous target point, the attribute including at least one of the following: a size, a presenting position, a color, a presenting duration, or a shape; presenting the target image in the second interface based on the attribute of the target image.

Based on the eighth example of the second aspect, in the tenth example of the second aspect, the apparatus further comprises:
a third operation instruction receiving module configured for receiving a third operation instruction for the second interface;
a second interface presentation stopping module configured for, in response to the third operation instruction, stopping presenting the second interface in the target application, and presenting a third interface or an initial interface of the target application, the third interface being used for presenting the music being played.

Based on the tenth example of the second aspect, in the eleventh example of the second aspect, the apparatus further comprises:
a screen flashing off module configured for, in response to the number of reception times of the third operation instruction exceeding or reaching a preset threshold of reception time, adjusting the operation control for controlling flashing screen in the first interface to an off state.

Based on the seventh example of the second aspect, in the twelfth example of the second aspect, the music turning on module is further configured for:
determining an intensity of the light source based on a time interval between the target point and a previous target point in response to playing until the target point of the music; and flashing the light source based on the intensity of the light source.

Based on the seventh example of the second aspect, in the thirteenth example of the second aspect, the music turning on module is further configured for:
determining an intensity of a vibration based on a time interval between the target point and a previous target point in response to playing until the target point of the music; and vibrating based on the intensity of the vibration.

Based on any of the first example to the thirteenth example of the second aspect, in the fourteenth example of the second aspect, the apparatus further comprises:
a fourth operation instruction receiving module configured for receiving a fourth operation instruction for the first interface.
a processing stopping module configured for stopping the at least one of processing for the music in the process of playing the music.

Based on any of the first example to the thirteenth example of the second aspect, in the fifteenth example of the second aspect, the apparatus further comprises:
a fifth operation instruction receiving module configured for receiving a fifth operation instruction for the first interface.
a first interface presentation stopping module configured for stopping presenting the first interface in the target application and presenting a third interface or an initial interface of the target application, the third interface being used for presenting the music being played.

In a third aspect, according to one or more embodiments of the present disclosure, there is provided an electronic device comprising at least one processor and memory;
the memory stores computer execution instructions;
the at least one processor executes the computer execution instructions stored by the memory, to cause the electronic device to carry out the method of any of the first aspect.

In a fourth aspect, according to one or more embodiments of the present disclosure, there is provided a computer readable storage medium storing computer execution instructions thereon. The computer execution instructions, when executed by a processor, cause a computing device to carry out the method of any of the first aspect.

In a fifth aspect, according to one or more embodiments of the present disclosure, there is provided a computer program for carrying out the method of any of the first aspect.

In a sixth aspect, according to one or more embodiments of the present disclosure, there is provided a computer program product, wherein the computer program product includes computer instructions for carrying out the method of any of the first aspect.

The above description is only a preferred embodiment of this disclosure and an explanation of the technical principles used. Those skilled in the art should understand that the scope of disclosure involved in the present disclosure is not limited to technical solutions formed by specific combinations of the aforementioned technical features, but also covers other technical solutions formed by any combination of the aforementioned technical features or their equivalent features without departing from the disclosed concept. For example, a technical solution formed by replacing the above features with (but not limited to) technical features with similar functions disclosed in this disclosure.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

We claim:

1. A method for music play, wherein the method comprises:
　receiving a first operation instruction in a target application for playing music;
　in response to the first operation instruction, presenting a first interface of the target application, the first interface including an operation control for enhancing a play performance of the music through at least one processing, the at least one processing being used for representing music content in a way more than sound, wherein the at least one processing comprises at least one of continuously amplifying a volume of the music, flashing a light source based on the music, flashing a screen based on the music, or vibrating based on the music;
　receiving a second operation instruction for the operation control; and
　processing the music based on the second operation instruction during a process of playing the music, wherein processing the music based on the second operation instruction during the process of playing the music comprises:
　　if the least one processing comprises at least one of flashing the light source based on the music, flashing the screen based on the music, or vibrating based on the music, performing the at least one processing in response to a target point of the music during the process of playing the music, wherein the second operation instruction is used for adjusting the operation control to an on state, wherein the target point comprises at least one of the following:
　　　a change point of a voice in the music,
　　　a change point of an instrument sound in the music, or
　　　a beat point of the music;
　　wherein the change point of the voice and/or the instrument sound comprises a volume change point, a timbre change point, and a tone change point; and
　　wherein performing the at least one processing in response to the target point of the music comprises:
　　　determining an intensity of the light source based on a time interval between the target point and a previous target point in response to the target point of the music;
　　　flashing the light source based on the intensity of the light source.

2. The method of claim 1, wherein before the processing the music based on the second operation instruction during the process of playing the music, the method further comprises:
　in response to the second operation instruction, start playing the music in the target application if the target application is not playing music.

3. The method according to claim 1, wherein if the operation control is used for continuously amplifying the volume of the music, the processing the music based on the second operation instruction during the process of playing the music comprises:
　determining an amplification parameter corresponding to the second operation instruction, the amplification parameter being any parameter between a minimum amplification parameter and a maximum amplification parameter;
　amplifying an original volume of the music based on the amplification parameter during the process of playing the music, the original volume being a volume specified in music data of the music.

4. The method according to claim 3, wherein the operation control is a continuous sliding control, and the operation control changes, during a continuous sliding process of the operation control, with at least one of the following attributes: a color, a size.

5. The method according to claim 3, wherein the determining the amplification parameter corresponding to the second operation instruction comprises:
　determining a unit amplification parameter corresponding to a unit size based on the maximum amplification parameter, the minimum amplification parameter and a size of the operation control; and
　determining the amplification parameter corresponding to the second operation instruction based on a slider position of the continuous sliding control and the unit amplification parameter.

6. The method according to claim 1, wherein before the performing the at least one processing in response to the target point of the music, the method further comprises:
　in response to playing the music, presenting a second interface in the target application; and
　wherein performing the at least one processing in response to the target point of the music comprises:
　　presenting a target image in the second interface in response to the target point of the music, the target image being an image including at least one color.

7. The method according to claim 6, wherein the presenting the target image in the second interface in response to the target point of the music comprises:
　in response to the target point of the music, determining an attribute of the target image based on a time interval between the target point and a previous target point, the attribute including at least one of the following: a size, a presenting position, a color, a presenting duration, or a shape; and
　presenting the target image in the second interface based on the attribute of the target image.

8. The method according to claim 6, wherein after presenting the target image in the second interface in response to the target point of the music, the method further comprises:
　receiving a third operation instruction for the second interface; and
　in response to the third operation instruction, stopping presenting the second interface in the target application, and presenting a third interface or an initial interface of the target application, the third interface being used for presenting the music being played.

9. The method according to claim 8, further comprising:
in response to the number of reception times of the third operation instruction exceeding or reaching a preset threshold of reception time, adjusting the operation control for controlling flashing screen in the first interface to an off state.

10. The method according to claim 1, wherein the performing the at least one processing in response to the target point of the music comprises:
determining an intensity of a vibration based on a time interval between the target point and a previous target point in response to the target point of the music; and
vibrating based on the intensity of the vibration.

11. The method according to claim 1, further comprising:
receiving a fourth operation instruction for the first interface; and
stopping the at least one of processing for the music in the process of playing the music.

12. The method according to claim 1, further comprising:
receiving a fifth operation instruction for the first interface; and
stopping presenting the first interface in the target application, and presenting a third interface or an initial interface of the target application, the third interface being used for presenting the music being played.

13. A device comprising at least one processor and memory:
the memory stores computer execution instructions;
the at least one processor executes the computer execution instructions stored by the memory, to cause the electronic device to perform a method comprising:
receiving a first operation instruction in a target application for playing music;
in response to the first operation instruction, presenting a first interface of the target application, the first interface including an operation control for enhancing a play performance of the music through at least one processing, the at least one processing being used for representing music content in a way more than sound, wherein the at least one processing comprises at least one of continuously amplifying a volume of the music, flashing a light source based on the music, flashing a screen based on the music, or vibrating based on the music;
receiving a second operation instruction for the operation control; and
processing the music based on the second operation instruction during a process of playing the music, wherein processing the music based on the second operation instruction during the process of playing the music comprises:
if the least one processing comprises at least one of flashing the light source based on the music, flashing the screen based on the music, or vibrating based on the music, performing the at least one processing in response to a target point of the music during the process of playing the music, wherein the second operation instruction is used for adjusting the operation control to an on state, wherein the target point comprises at least one of the following:
a change point of a voice in the music,
a change point of an instrument sound in the music, or
a beat point of the music;
wherein the change point of the voice and/or the instrument sound comprises a volume change point, a timbre change point, and a tone change point; and
wherein performing the at least one processing in response to the target point of the music comprises:
determining an intensity of the light source based on a time interval between the target point and a previous target point in response to the target point of the music, and
flashing the light source based on the intensity of the light source.

14. The device of claim 13, wherein if the operation control is used for continuously amplifying the volume of the music, the processing the music based on the second operation instruction during the process of playing the music comprises:
determining an amplification parameter corresponding to the second operation instruction, the amplification parameter being any parameter between a minimum amplification parameter and a maximum amplification parameter;
amplifying an original volume of the music based on the amplification parameter during the process of playing the music, the original volume being a volume specified in music data of the music.

15. A non-transitory computer-readable storage medium storing instructions which, when executed by a processor, cause the processor to perform a method comprising:
receiving a first operation instruction in a target application for playing music;
in response to the first operation instruction, presenting a first interface of the target application, the first interface including an operation control for enhancing a play performance of the music through at least one processing, the at least one processing being used for representing music content in a way more than sound, wherein the at least one processing comprises at least one of continuously amplifying a volume of the music, flashing a light source based on the music, flashing a screen based on the music, or vibrating based on the music;
receiving a second operation instruction for the operation control;
processing the music based on the second operation instruction during a process of playing the music, wherein processing the music based on the second operation instruction during the process of playing the music comprises:
if the least one processing comprises at least one of flashing the light source based on the music, flashing the screen based on the music, or vibrating based on the music, performing the at least one processing in response to a target point of the music during the process of playing the music, wherein the second operation instruction is used for adjusting the operation control to an on state, wherein the target point comprises at least one of the following:
a change point of a voice in the music,
a change point of an instrument sound in the music, or
a beat point of the music; and
wherein the change point of the voice and/or the instrument sound comprises a volume change point, a timbre change point, and a tone change point; and wherein performing the at least one processing in response to the target point of the music comprises:
- determining an intensity of the light source based on a time interval between the target point and a previous target point in response to the target point of the music, and
- flashing the light source based on the intensity of the light source.

* * * * *